(12) United States Patent
Lee et al.

(10) Patent No.: US 11,772,551 B2
(45) Date of Patent: Oct. 3, 2023

(54) SCREEN CONTROL APPARATUS OF A MOVING OBJECT, A METHOD THEREOF, AND A SYSTEM THEREOF

(71) Applicants: HYUNDAI MOTOR COMPANY, Seoul (KR); KIA CORPORATION, Seoul (KR)

(72) Inventors: Tae Ho Lee, Seoul (KR); Mun Jun Hur, Yongin-si (KR); Hyeo Jin Kim, Seoul (KR); Hyun Woo Koo, Seoul (KR); Kwang Seung Heo, Seoul (KR); Kyowoong Choo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 48 days.

(21) Appl. No.: 17/497,710

(22) Filed: Oct. 8, 2021

(65) Prior Publication Data
US 2022/0185176 A1 Jun. 16, 2022

(30) Foreign Application Priority Data
Dec. 10, 2020 (KR) ........................ 10-2020-0172508

(51) Int. Cl.
*B60Q 3/18* (2017.01)
*G06N 20/00* (2019.01)
*B60K 35/00* (2006.01)

(52) U.S. Cl.
CPC ............... *B60Q 3/18* (2017.02); *B60K 35/00* (2013.01); *G06N 20/00* (2019.01)

(58) Field of Classification Search
CPC .............. B60Q 3/18; B60K 2370/5915; G09G 2320/0626
See application file for complete search history.

(56) References Cited

U.S. PATENT DOCUMENTS 9,454,925 B1 * 9/2016 Grafton .................... G09G 5/00
2021/0158765 A1 * 5/2021 Nishimura ............. B60Q 3/208

FOREIGN PATENT DOCUMENTS

WO WO-2020246827 A1 * 12/2020

* cited by examiner

Primary Examiner — Priyank J Shah
(74) Attorney, Agent, or Firm — LEMPIA SUMMERFIELD KATZ LLC

(57) ABSTRACT

A screen control apparatus of a moving object, a method thereof, and a system thereof are provided. The screen control apparatus includes: a communication device that receives illumination measurement data measured by at least one information providing moving object from a server; an illumination score calculating device that calculates an illumination score for the received illumination measurement data; an illumination determining device that selects reference illumination measurement data depending on the illumination score and determine illumination; and a controller that controls a screen brightness on the basis of the determined illumination.

18 Claims, 11 Drawing Sheets

| ILLUMINATION |
|---|
| MEASUREMENT TIME |
| MEASUREMENT POSITION |
| DRIVING DIRECTION |
| SENSOR INFORMATION |
| WEATHER INFORMATION (RAIN/CLOUDY) |
| VEHICLE MODEL INFORMATION |
| VEHICLE TYPE INFORMATION (SUV/SEDAN) |
| TINTING INFORMATION |
| ⋮ |

FIG.3

SCREEN CONTROL APPARATUS OF A MOVING OBJECT, A METHOD THEREOF, AND A SYSTEM THEREOF

CROSS-REFERENCE TO RELATED APPLICATION

This application claims the benefit of priority to Korean Patent Application No. 10-2020-0172508, filed in the Korean Intellectual Property Office on Dec. 10, 2020, the entire contents of which are incorporated herein by reference.

TECHNICAL FIELD

The present disclosure relates to a screen control apparatus of a moving object, a method thereof, and a system thereof.

BACKGROUND

In general, a vehicle may measure illumination using its illumination sensor and may adjust a screen of a device in the vehicle and a brightness of the screen based on the measured illumination.

Herein, to adjust the screen and the screen brightness, the illumination sensor should be provided in the vehicle or the device.

Recently, illumination information may be received and shared by means of a communication interface from another device without directly installing the illumination sensor in the vehicle. However, it is not easy to determine whether the shared illumination information is suitable for a screen of a vehicle device.

SUMMARY

The present disclosure has been made to solve the above-mentioned problems occurring in the prior art while advantages achieved by the prior art are maintained intact.

An aspect of the present disclosure provides a screen control apparatus of a moving object for receiving illumination measurement data by means of a server of a connected car system without having a separate illumination sensor. The apparatus may adjust a screen brightness of the display to save the cost of constructing the sensor. The present disclosure also provides a method thereof.

Another aspect of the present disclosure provides a screen control apparatus of a moving object for calculating illumination scores for each of a plurality of received illumination measurement data and assigning a weight for each reference item to provide the most suitable screen brightness of the display. The present disclosure also provides a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a screen control apparatus of a moving object may include a communication device that receives illumination measurement data measured by at least one information providing moving object from a server. The apparatus may also include an illumination score calculating device that calculates an illumination score for the received illumination measurement data. The apparatus may also include an illumination determining device that selects reference illumination measurement data depending on the illumination score and determine illumination. The apparatus may also include a controller that controls a screen brightness on the basis of the determined illumination.

The illumination measurement data may include illumination information measured by the at least one information providing moving object and may further include a measurement time, a measurement position, a driving direction, sensor information, weather information, moving object information, or a tinting degree.

The illumination score calculating device may compare information of the illumination measurement data for each reference item with information of a moving object to assign a score and may add a score assigned for each reference item to calculate the illumination score of the illumination measurement data.

The illumination score calculating device may assign a weight for each reference time and may apply the weight for each reference item to the score assigned for each reference item to calculate the illumination score of the illumination measurement data.

The weight for each reference item may be determined according to a measurement value of an environment sensor.

The weight for each reference item may be determined according to a user setting.

The screen control apparatus may further include a weight learning device that learns the weight determined according to the user setting.

The weight for each reference item may be determined according to the result of learning the weight.

The illumination determining device may select illumination measurement data with the highest illumination score as the reference illumination measurement data.

The illumination determining device may correct the illumination depending on a tinting degree of the reference illumination measurement data and a tinting degree of a moving object, when the tinting degree of the reference illumination measurement data differs from the tinting degree of the moving object.

The illumination determining device may upwardly adjust an illumination of the reference illumination measurement data by the tinting degree of the reference illumination measurement data and may downwardly adjust the upwardly adjusted illumination by the tinting degree of the moving object.

According to another aspect of the present disclosure, a screen control method of a moving object may include receiving illumination measurement data measured by at least one information providing moving object from a server. The method may further include calculating an illumination score for the received illumination measurement data. The method may further include selecting reference illumination measurement data depending on the illumination score and determining illumination. The method may further include controlling a screen brightness on the basis of the determined illumination.

According to another aspect of the present disclosure, a system may include at least one information providing moving object that provides illumination measurement data based on illumination measured using an illumination sensor. The system may further include a moving object that receives illumination measurement data measured by the at least one information providing moving object, calculates an illumination score for each illumination measurement data, and controls a screen brightness based on illumination of reference illumination measurement data selected according to the illumination score. The system may further include a server that collects and transmits the illumination measurement data between the at least one information providing moving object and the moving object.

BRIEF DESCRIPTION OF THE DRAWINGS

The above and other objects, features, and advantages of the present disclosure should be more apparent from the following detailed description taken in conjunction with the accompanying drawings:

FIG. 3 is a drawing illustrating an embodiment of illumination measurement data according to an embodiment of the present disclosure;

DETAILED DESCRIPTION

Figure 1:
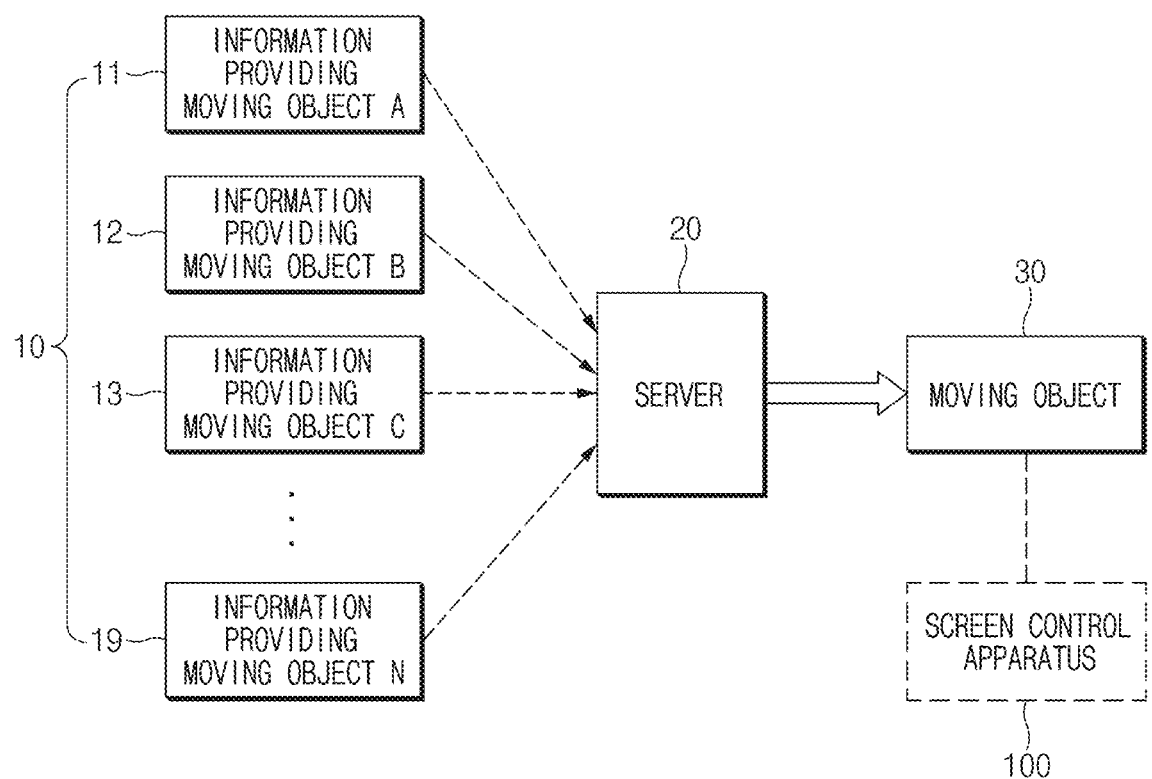
FIG. 1 is a block diagram illustrating a system according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions has been omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary should be interpreted as having meanings consistent with the contextual meanings in the relevant field of art. Such terms should not to be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram illustrating a system according to an embodiment of the present disclosure.

Referring to FIG. 1, the system may include one or more information providing moving objects 11 to 19, a server 20, and a moving object 30. Herein, the system may be a connected car system.

The information providing moving objects 11 to 19 and the moving object 30 may correspond to moving means, each of which has a display. As an example, the information providing moving objects 11 to 19 and the moving object 30 may include various types of moving means such as a vehicle, an electric kickboard, and an urban air mobility (UAM) apparatus. Herein, it is described that the moving object 30 is a vehicle for convenience of description in the embodiment below, but not limited thereto.

The one or more information providing moving objects 11 to 19 may include a moving object having an illumination sensor. At this time, an information providing moving object 10 may adjust a brightness of a screen in the moving object 30 depending on an illumination value measured by the illumination sensor.

The information providing moving object 10 may be communicatively connected to the server 20 to transmit illumination measurement data to the server 20 in real time when measuring illumination. The information providing moving object 10 may transmit illumination measurement data to the server 20 whenever an illumination change event occurs.

Herein, the illumination measurement data may include information, such as a measurement time, a measurement position, a driving direction, sensor information, weather information, moving object information (e.g., a model, a vehicle type, or the like), and/or a tinting degree, as well as illumination information measured by the illumination sensor.

The server 20 may be a connected car service (CCS) server. The server 20 may be communicatively connected with the one or more information providing moving objects 11 to 19 and the moving object 30 to provide the one or more information providing moving objects 11 to 19 and/or the moving object 30 with a CCS.

The server 20 may collect and manage illumination measurement data from the one or more information providing moving objects 11 to 19. In this case, the server 20 may provide the moving object 30, which does not have an illumination sensor with the collected illumination measurement data.

Herein, the server 20 may extract illumination measurement data measured within a certain range from a current position of the moving object 30 and may provide the moving object 30 with the illumination measurement data, on the basis of the current position of the moving object 30.

The server 20 may provide the moving object 30 with illumination measurement data collected in real time. The server 20 may provide the moving object 30 with illumination measurement data collected during a certain period of time for each certain period.

Because the moving object 30 does not have an illumination sensor, it may be communicatively connected with the server 20 to receive illumination measurement data from the server 20.

Herein, the moving object 30 may include a screen control apparatus 100. The screen control apparatus 100 may adjust a screen brightness of a display using the illumination measurement data received from the server 20. In this case, the screen control apparatus 100 may calculate an illumination score for each received data and may determine illumination suitable for a screen of the display based on the calculated illumination score.

The screen control apparatus 100 of the moving object according to an embodiment of the present disclosure may be implemented in the moving object 30. In this case, the screen control apparatus 100 may be integrally configured with control units in the moving object 30 or may be implemented as a separate device to be connected with the control units of the moving object 30 by a separate connection means. Thus, a detailed configuration and operation of the screen control apparatus 100 is described with reference to an embodiment of FIG. 2.

Figure 2:
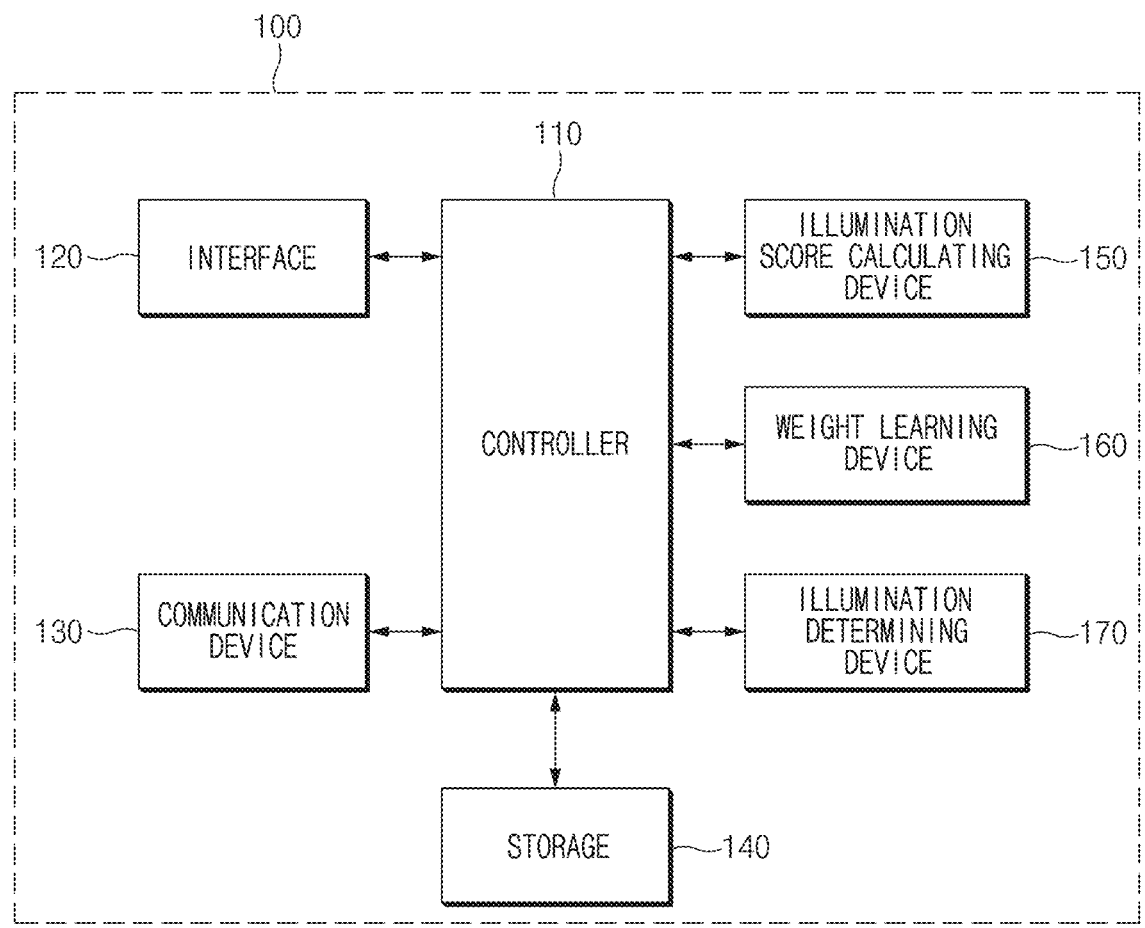
FIG. 2 is a block diagram illustrating a configuration of a screen control apparatus of a moving object according to an embodiment of the present disclosure.

FIG. 2 is a block diagram illustrating a configuration of a screen control apparatus of a moving object according to an embodiment of the present disclosure.

Referring to FIG. 2, a screen control apparatus 100 of a moving object may include a controller 110, an interface 120, a communication device 130, a storage 140, an illumination score calculating device 150, a weight learning device 160, and an illumination determining device 170. Herein, the controller 110, the illumination score calculating device 150, the weight learning device 160, and the illumination determining device 170 of the screen control apparatus 100 may be implemented as at least one processor.

The controller 110 may control operations of the respective components of the screen control apparatus 100 and may process a signal delivered between the respective components.

The interface 120 may include an input means for receiving a control command from a user and an output means for outputting an operation state, an operation result, or the like of the screen control apparatus 100.

Herein, the input means may include a key button and may include a soft key implemented on a display. Furthermore, the input means may include a mouse, a joystick, a jog shuttle, a stylus pen, or the like.

An output means may include a display and may include a voice output means such as a speaker.

In this case, when a touch sensor such as a touch film, a touch sheet, or a touch pad is provided in the display, the display may operate as a touchscreen and may be implemented in a form where the input means and the output means are integrated with each other.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The communication device 130 may include a communication module for vehicle network communication with electronics and/or controller provided in the moving object 30.

Herein, a technology for the vehicle network communication may include controller area network (CAN) communication, local interconnect network (LIN) communication, flex-ray communication, or the like.

Furthermore, the communication device 130 may include a communication module for accessing wireless Internet or a communication module for short range communication.

Herein, a technology for the wireless Internet may include wireless local area network (WLAN), wireless broadband (WiBro), wireless-fidelity (Wi-Fi), world interoperability for microwave access (WiMAX), or the like.

Furthermore, a technology for the short range communication may include Bluetooth, ZigBee, ultra-wideband (UWB), radio frequency identification (RFID), infrared data association (IrDA), or the like.

As an example, the communication module may be communicatively connected with a server 20 of FIG. 1 to receive illumination measurement data from the server 20. In this case, the communication module may receive illumination measurement data in real time or at a certain period.

The storage 140 may store data, an algorithm, and/or the like necessary for an operation of the screen control apparatus 100.

As an example, the storage 140 may store the illumination measurement data received from the server 20. Furthermore, the storage 140 may store a command and/or algorithm for calculating an illumination score of illumination measurement data to determine illumination and adjusting a screen brightness of the display on the basis of the illumination. Furthermore, the storage 140 may store weight information applied when an illumination score is calculated and an algorithm for learning a weight.

Herein, the storage 140 may include a storage medium such as a random access memory (RAM), a static RAM (SRAM), a read-only memory (ROM), a programmable ROM (PROM), or an electrically erasable PROM (EEPROM).

When the illumination measurement data is received from the server 20 via the communication device 130, the controller 110 may deliver the received illumination measurement data to the illumination score calculating device 150.

An embodiment of the illumination measurement data is described with reference to FIG. 3. FIG. 3 is a drawing illustrating an embodiment of illumination measurement data according to an embodiment of the present disclosure.

Referring to FIG. 3, the illumination measurement data may include information, such as a measurement time, a measurement position, a driving direction, sensor information, weather information, moving object information (e.g., a model, a vehicle type, or the like), and/or a tinting degree, as well as illumination information measured by a illumination sensor.

In this case, the illumination measurement data received from a server 20 of FIG. 1 may be measured within a certain range from a current position of a moving object 30 of FIG. 1, on the basis of the current position of the moving object 30. One or more illumination measurement data may be received from the server 20.

An illumination score calculating device 150 of FIG. 2 may calculate an illumination score of the illumination measurement data. In this case, the illumination score calculating device 150 may calculate an illumination score for one or more illumination measurement data received from the server 20.

At this time, the illumination score calculating device 150 may calculate illumination scores for all illumination measurement data received from the server 20. Meanwhile, the illumination score calculating device 150 may select a certain number of received illumination measurement data in an order of from most to least received among a plurality of received illumination measurement data and may calculate illumination scores for the selected illumination measurement data.

The criterion of selecting illumination measurement data is applicable in various manners according to an implementation form.

The illumination score calculating device 150 may calculate an illumination score for each data on the basis of information included in the illumination measurement data, for example, a measurement time, a measurement position, a driving direction, sensor information, weather information, moving object information (e.g., a model, a vehicle type, or the like), and/or a tinting degree.

As an example, the illumination score calculating device 150 may calculate an illumination score for each data on the basis of all items included in the illumination measurement data.

Meanwhile, the illumination score calculating device 150 may calculate an illumination score for each data on the basis of certain items among pieces of information included in the illumination measurement data. Herein, a reference item for calculating an illumination score may be determined in various manners according to an implementation form. For example, the reference item may be selected in advance by a user. Meanwhile, the reference item may be automatically selected by a learning algorithm.

At this time, the illumination score calculating device 150 may compare information of the moving object 30 with the pieces of information included in the illumination measurement data and may calculate an illumination score on the basis of the items, which are identical to each other.

Figure 4:
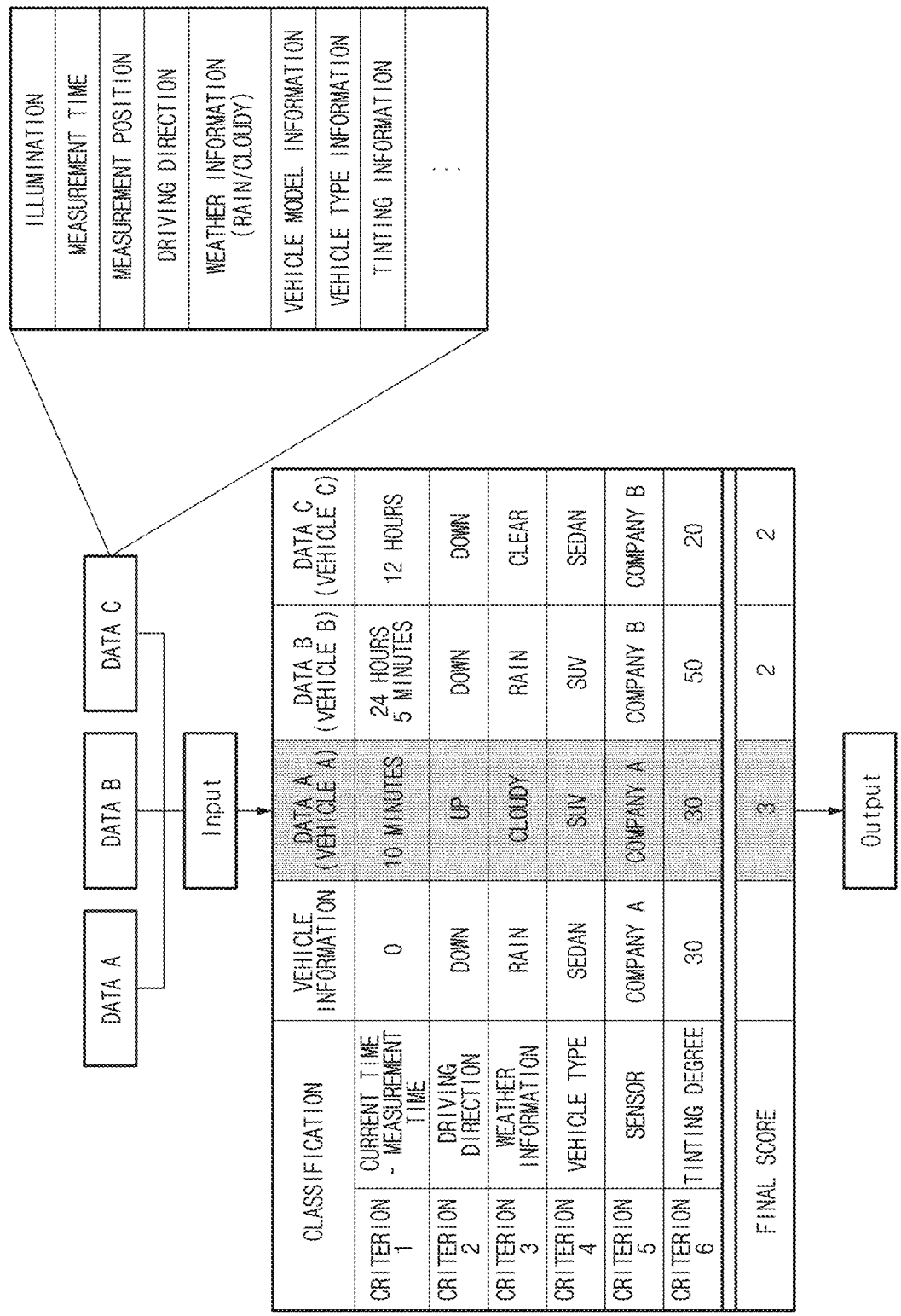
FIG. 4 is a drawing illustrating an embodiment referenced to describe an operation of calculating an illumination score according to an embodiment of the present disclosure.

An embodiment of the operation of calculating the illumination score for each data is described with reference to FIG. 4. FIG. 4 is a drawing illustrating an embodiment referenced to describe an operation of calculating an illumination score according to an embodiment of the present disclosure.

Referring to FIG. 4, an illumination score calculating device 150 of FIG. 2 may calculate illumination scores for three illumination measurement data, i.e., data A, data B, and data C.

In this case, the illumination score calculating device 150 may calculate illumination scores on the basis of some of items included in each data, for example, a measurement time, a driving direction, weather information, a model, a sensor, and a tinting degree.

Criterion 1 for calculating an illumination score is a time difference between the current time and an illumination measurement time. When assuming that the current time is "0" with respect to a moving object 30 of FIG. 1, because the time difference between the current time and a time when data A is measured is 10 minutes, the time difference between the current time and a time when data B is measured is 24 hours 5 minutes, the time difference between the current time and a time when data C is measured is 12 hours, the illumination score calculating device 150 may assign a score to data A for criterion A.

Criterion 2 for calculating an illumination score is a driving direction. Because the driving direction of the target moving object 30 is down, the driving direction of data A is up, and the driving directions of data B and C are down, the illumination score calculating device 150 may assign a score to each of data B and C for criterion 2.

Criterion 3 for calculating an illumination score is weather information. Because the weather around the target moving object 30 is rain, the weather around data A is cloudy, the weather around data B is rain, and the weather around data C is clear, the illumination score calculating device 150 may assign a score to data B for criterion 3.

Criterion 4 for calculating an illumination score is a vehicle type. Because the vehicle type of the target moving object 30 is a sedan, the vehicle types of data A and B are SUVs, and the vehicle type of data C is a sedan, the illumination score calculating device 150 may assign a score to data C for criterion 4.

Criterion 5 for calculating an illumination score is a sensor. Because the current sensor of the moving object 30 is made by company A, the sensor of data A is made by company A, and the sensors of data B and C are made by company B, the illumination score calculating device 150 may assign a score to data A for criterion 5.

Finally, criterion 6 for calculating an illumination score is a tinting degree. Because the current tinting degree of the moving object 30 is 30, the tinting degree of data A is 30, the tinting degree of data B is 50, and the tinting degree of data C is 20, the illumination score calculating device 150 may assign a score to data A for criterion 6.

In this case, the illumination score calculating device 150 may assign one point for each reference item and may add a score assigned for each reference item to calculate an illumination score for each data.

Data A is assigned one point at a time for criterion 1, criterion 5, and criterion 6 to have the final illumination score of 3 points. Data B is assigned one point at a time for criterion 2 and criterion 3 to have the final illumination score of 2 points. Data C is assigned one point at a time for criterion 2 and criterion 4 to have the final illumination score of 2 points.

The illumination score calculating device 150 may deliver the illumination score calculated for each data to an illumination determining device 170 of FIG. 2.

Thus, the illumination determining device 170 may select data with the highest illumination score as reference illumination measurement data and may determine illumination from the reference illumination measurement data. In the embodiment of FIG. 4, because data A has the highest illumination score, the illumination determining device 170 may determine data A as the reference illumination measurement data and may determine illumination to be applied to the moving object 30 on the basis of the illumination information of data A.

In this case, the illumination determining device 170 may compare a tinting degree of the moving object 30 with a tinting degree of the reference illumination measurement data.

When the tinting degrees differ from each other, the illumination determining device 170 may adjust illumination based on the tinting degree of the moving object 30.

Herein, because the tinting degree of data A, which is the reference illumination measurement data, is identical to the tinting degree of the moving object 30, the illumination determining device 170 may determine illumination of data A as illumination to be applied to the moving object 30 without illumination adjustment.

When the illumination is determined by the illumination determining device 170, a controller 110 of FIG. 2 may adjust a screen brightness of a display on the basis of the determined illumination.

Meanwhile, when calculating an illumination score for each data, the illumination score calculating device 150 may apply a weight for each reference item to calculate the illumination score.

Herein, the weight for each reference item may be assigned to an environment variable based on an environment sensor value.

Figure 5:
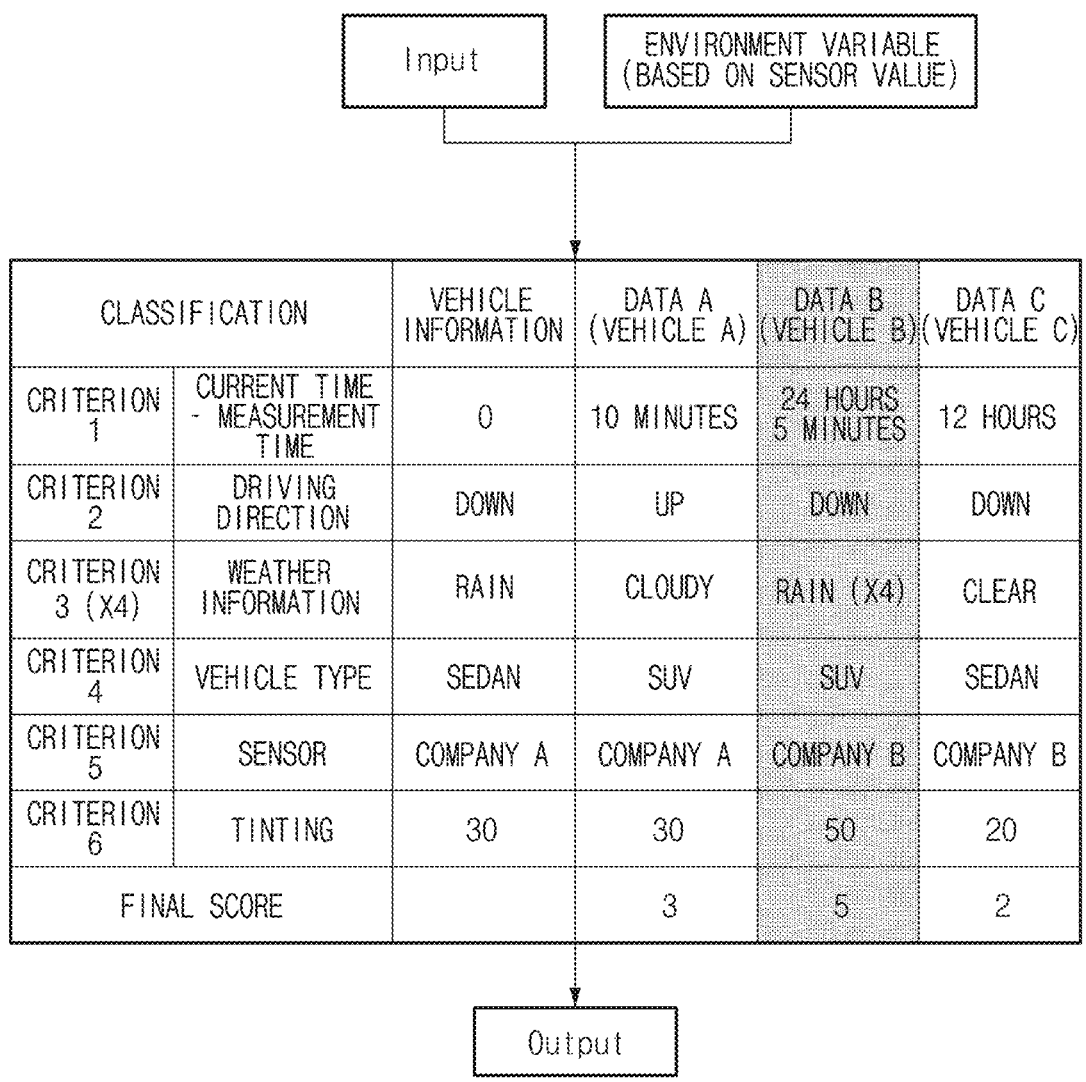
FIGS. 5 and 6 are drawings illustrating an embodiment referenced to describe an operation of calculating an illumination score according to another embodiment of the present disclosure.

An embodiment of the operation of reflecting the weight assigned on the basis of the environment variable to calculate the illumination score is described with reference to FIG. 5. FIG. 5 is a drawing illustrating an embodiment referenced to describe an operation of calculating an illumination score according to another embodiment of the present disclosure.

Referring to FIG. 5, an illumination score calculating device 150 of FIG. 2 may calculate illumination scores for three illumination measurement data, i.e., data A, data B, and data C.

In this case, the illumination score calculating device 150 may calculate illumination scores on the basis of some of items included in each data, for example, a measurement time, a driving direction, weather information, a vehicle type, a sensor, and a tinting degree.

Each reference item for calculating an illumination score is the same as the embodiment of FIG. 4.

Thus, data A is assigned one point at a time for criterion 1, criterion 5, and criterion 6 to have a final illumination score of 3 points. Data B is assigned one point at a time for criterion 2 and criterion 3 to have a final illumination score of 2 points. Data C is assigned one point at a time for criterion 2 and criterion 4 to have a final illumination score of 2 points.

Herein, when snow or rain is detected by a rain sensor, a weight may be assigned to an environment variable. At this time, a weight may be adjusted according to the amount of snow or rain.

In the embodiment of FIG. 5, the weight 'x4' is assigned to criterion 3 corresponding to the environment variable.

Thus, data B is assigned one point for criterion 2 and has a final illumination score of 5 points as the weight (x4) is applied to one point assigned for criterion 3.

Thus, an illumination determining device 170 of FIG. 2 may select data B with the highest illumination score as reference illumination measurement data and may determine illumination to be applied to a moving object 30 of FIG. 1 on the basis of the illumination information of the data B.

Meanwhile, the weight for each reference time may be assigned according to a user setting.

Furthermore, the weight for each reference time may be assigned based on the learned result of a weight learning device 160 of FIG. 2 In this case, the weight learning device 160 may learn the weight for each item according to a previous user setting.

Figure 6:
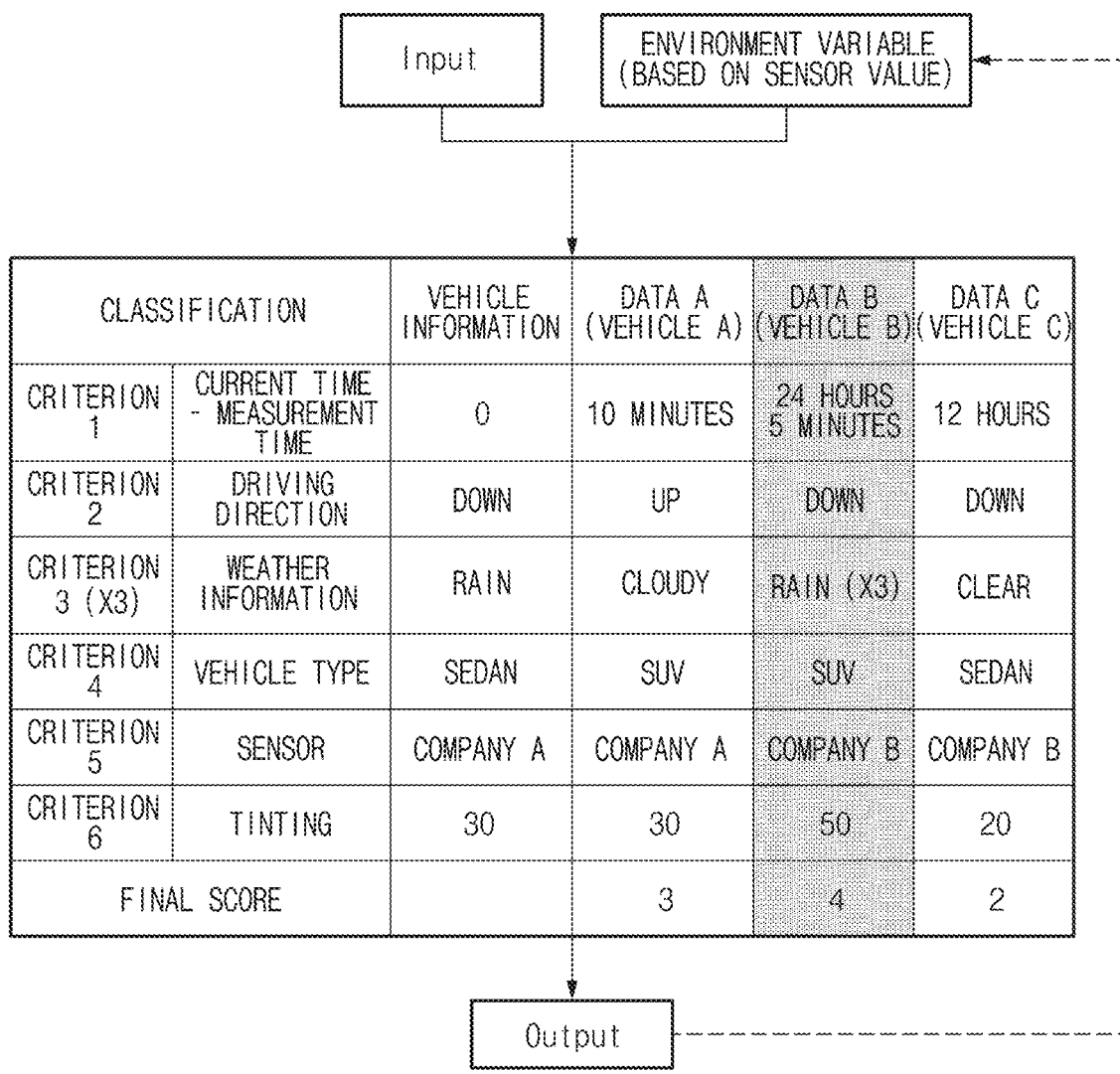

An embodiment of the operation of reflecting the weight assigned based on the user setting or the result of learning the weight to calculate the illumination score is described with reference to FIG. 6. FIG. 6 is a drawing illustrating an embodiment referenced to describe an operation of calculating an illumination score according to another embodiment of the present disclosure.

Referring to FIG. 6, an illumination score calculating device 150 of FIG. 2 may calculate illumination scores for three illumination measurement data, i.e., data A, data B, and data C.

In this case, the illumination score calculating device 150 may calculate illumination scores on the basis of some of items included in each data, for example, a measurement time, a driving direction, weather information, a vehicle type, a sensor, and a tinting degree.

Each reference item for calculating an illumination score is the same as the embodiment of FIG. 4.

Thus, data A is assigned one point at a time for criterion 1, criterion 5, and criterion 6 to have a final illumination score of 3 points. Data B is assigned one point at a time for criterion 2 and criterion 3 to have a final illumination score of 2 points. Data C is assigned one point at a time for criterion 2 and criterion 4 to have a final illumination score of 2 points.

Herein, a weight may be assigned to each reference time according to a user setting or the result of learning a weight for the user setting.

In the embodiment of FIG. 6, the weight 'x3' is assigned to criterion 3 corresponding to an environment variable according to a user setting or the result of learning a weight.

Thus, data B is assigned one point for criterion 2 and has a final illumination score of 4 points as the weight (x3) is applied to one point assigned for criterion 3.

Thus, an illumination determining device 170 of FIG. 2 may select data B with the highest illumination score as reference illumination measurement data and may determine illumination to be applied to a moving object 30 of FIG. 1 on the basis of the illumination information of the data B.

The illumination determining device 170 may compare a tinting degree of the moving object 30 with a tinting degree of the reference illumination measurement data. When the tinting degrees are identical to each other, the illumination determining device 170 may determine an illumination value of the reference illumination measurement data as illumination to be applied to the moving object 30.

Meanwhile, the illumination determining device 170 may compare a tinting degree of the moving object 30 with a tinting degree of the reference illumination measurement data. When the tinting degrees differ from each other, the illumination determining device 170 may reflect the tinting density of the moving object 30 to adjust illumination.

Figure 7:
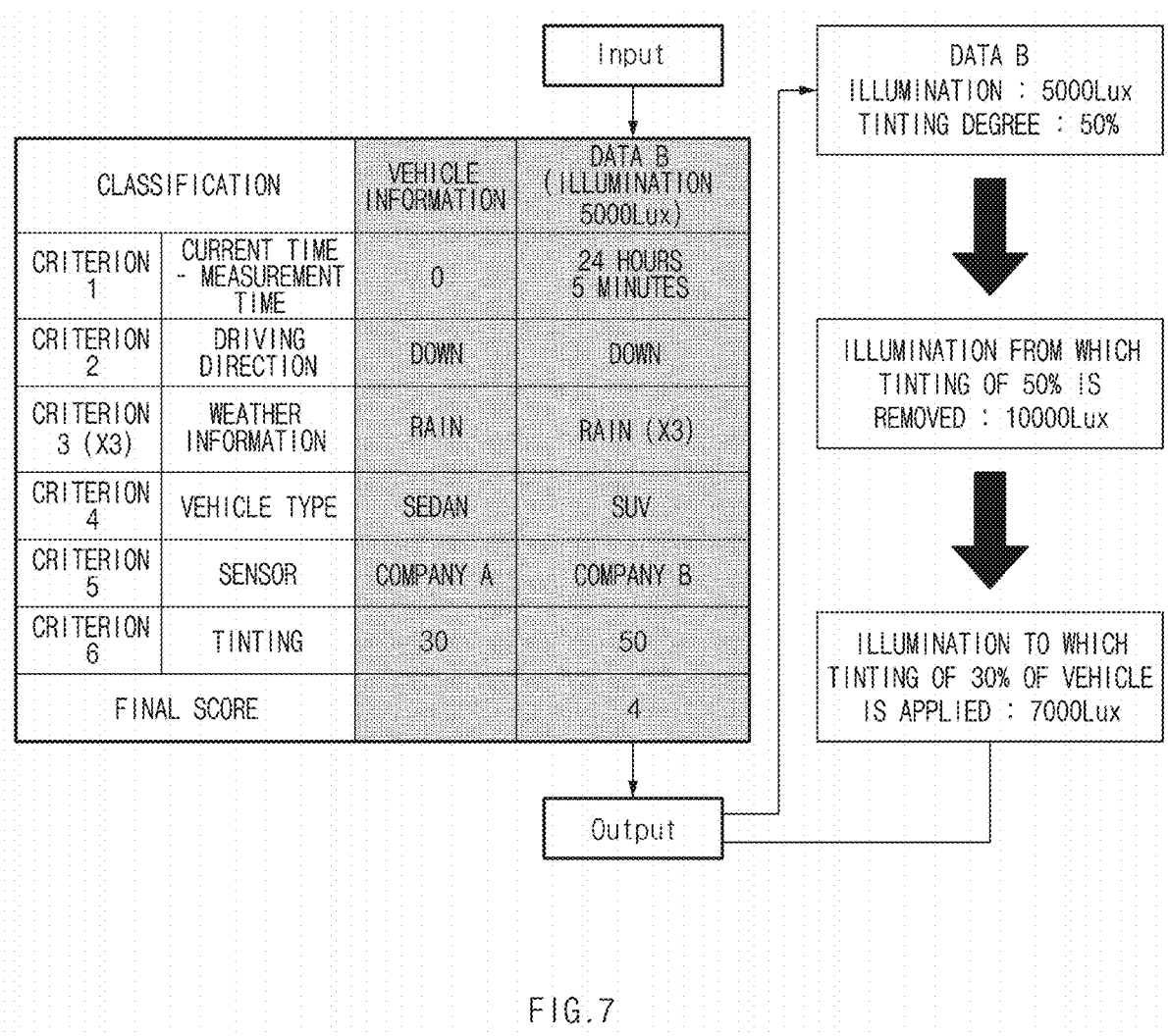
FIG. 7 is a drawing illustrating an embodiment referenced to describe an operation of determining illumination according to an embodiment of the present disclosure.

An embodiment of the operation of determining illumination with regard to the tinting degree is described with reference to FIG. 7. FIG. 7 is a drawing illustrating an embodiment referenced to describe an operation of determining illumination according to an embodiment of the present disclosure.

An embodiment of FIG. 7 indicates an operation of determining illumination on the basis of data B determined as reference illumination measurement data in FIG. 6 and adjusting the illumination depending on a tinting degree.

When the tinting density is dark, distortion may occur when illumination is measured. Thus, when the tinting degree of data B and the tinting degree of the moving object 30 differ from each other, there is a need to adjust illumination by reflecting the tinting degree of data B and the tinting degree of the moving object 30 in the illumination.

Thus, referring to FIG. 7, because the tinting degree of the moving object 30 is 30% and because the tinting degree of data B, which is the reference illumination measurement data, is 50%, distortion may occur when an illumination value of data B is applied to the moving object 30 without change.

Thus, an illumination determining device 170 of FIG. 2 may adjust the previously determined illumination depending on the tinting degree. At this time, when removing a tinting effect from the illumination value of data B and giving a tinting effect of the moving object 30 to apply illumination, the illumination determining device 170 may obtain illumination recognized substantially in the target moving object 30.

For example, because data B has an illumination of 5000 Lux and has a tinting degree of 50%, it has an illumination of 10000 Lux by removing a tinting effect of 50% from 5000 Lux.

At this time, when the tinting effect of 30% of the target moving object 30 is given to the illumination of 10000 Lux, illumination at the tinting of 30% becomes 7000 Lux.

Thus, the illumination determining device 170 may determine the adjusted illumination of 7000 Lux as final illumination to be applied to the target moving object 30.

When the illumination is determined by the illumination determining device 170, a controller 110 of FIG. 2 may adjust a screen brightness of a display on the basis of the determined illumination.

As such, the screen control apparatus 100 of a moving object according to an embodiment of the present disclosure may receive illumination information by means of a server 20 of FIG. 1, which provides a connected car service, without having a separate illumination sensor to save costs according to construction of the illumination sensor. The screen control apparatus 100 may also select the most suitable illumination with regard to a state of the moving object 30 among pieces of illumination information received from the server 20 to adjust the screen brightness of the display to an optimal screen brightness.

The screen control apparatus 100 of the moving object according to an embodiment of the present disclosure, which performs the above-mentioned operations, may be implemented in the form of an independent hardware device including a memory and a processor for processing each operation or may be driven in the form of being included in another hardware device such as a microprocessor or a universal computer system.

A description is given in detail of operation flow of the screen control apparatus 100 according to an embodiment of the present disclosure, having the above-mentioned configuration.

Figure 8:
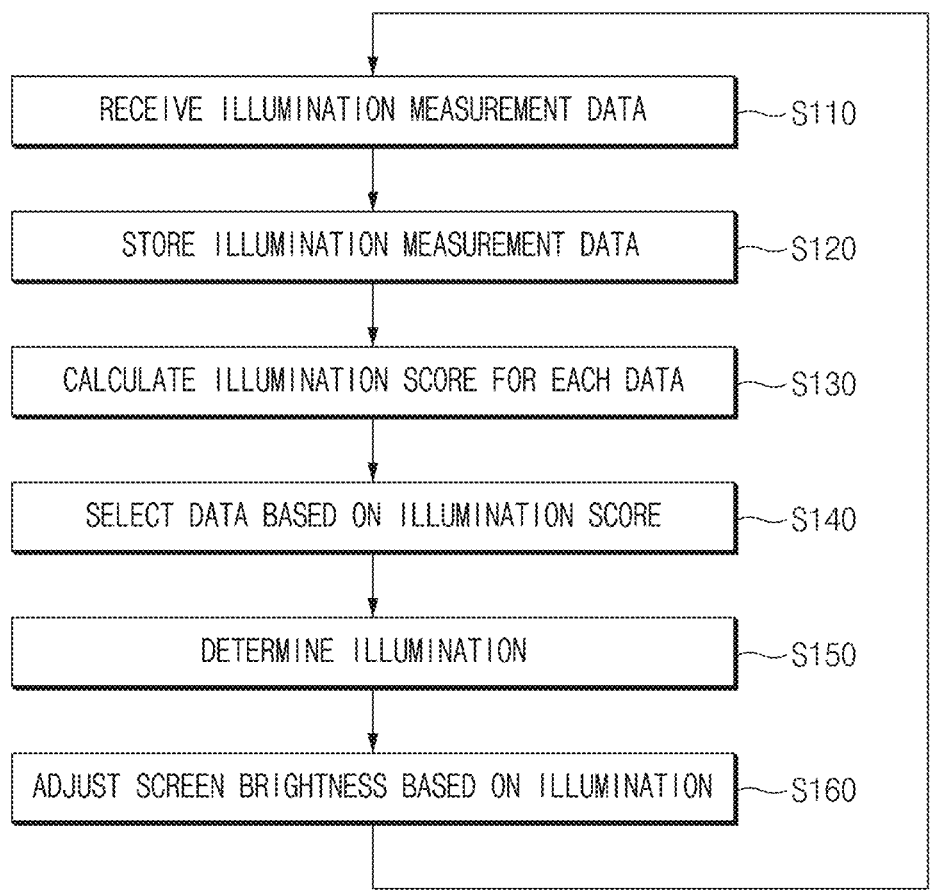
FIG. 8 is a drawing illustrating an operational flow of a screen control method of a moving object according to an embodiment of the present disclosure.

FIG. 8 is a drawing illustrating an operational flow of a screen control method of a moving object according to an embodiment of the present disclosure.

Referring to FIG. 8, when at least one illumination measurement data is received from a server 20 of FIG. 1 in S110, in S120, a screen control apparatus 100 of FIG. 1 may store the at least one received illumination measurement data.

In S130, the screen control apparatus 100 may calculate an illumination score for each data for the at least one illumination measurement data stored in S120.

In S130, the screen control apparatus 100 may determine reference items for calculating an illumination score among pieces of information included in the illumination measurement data and may compare information of the moving object 30 with pieces of information in data to assign a score for each reference item. Thus, an embodiment of the operation of calculating the illumination score refers to FIG. 4.

In S140, the screen control apparatus 100 may select data with the highest illumination score based on an illumination score for each data calculated in S130. At this time, the selected data may be used as reference illumination measurement data.

Thus, in S150, the screen control apparatus 100 may determine illumination to be applied to the moving object 30 on the basis of illumination information of the data selected in S140. In S160, the screen control apparatus 100 may adjust a screen brightness of the display based on the illumination determined in S150.

Figure 9:
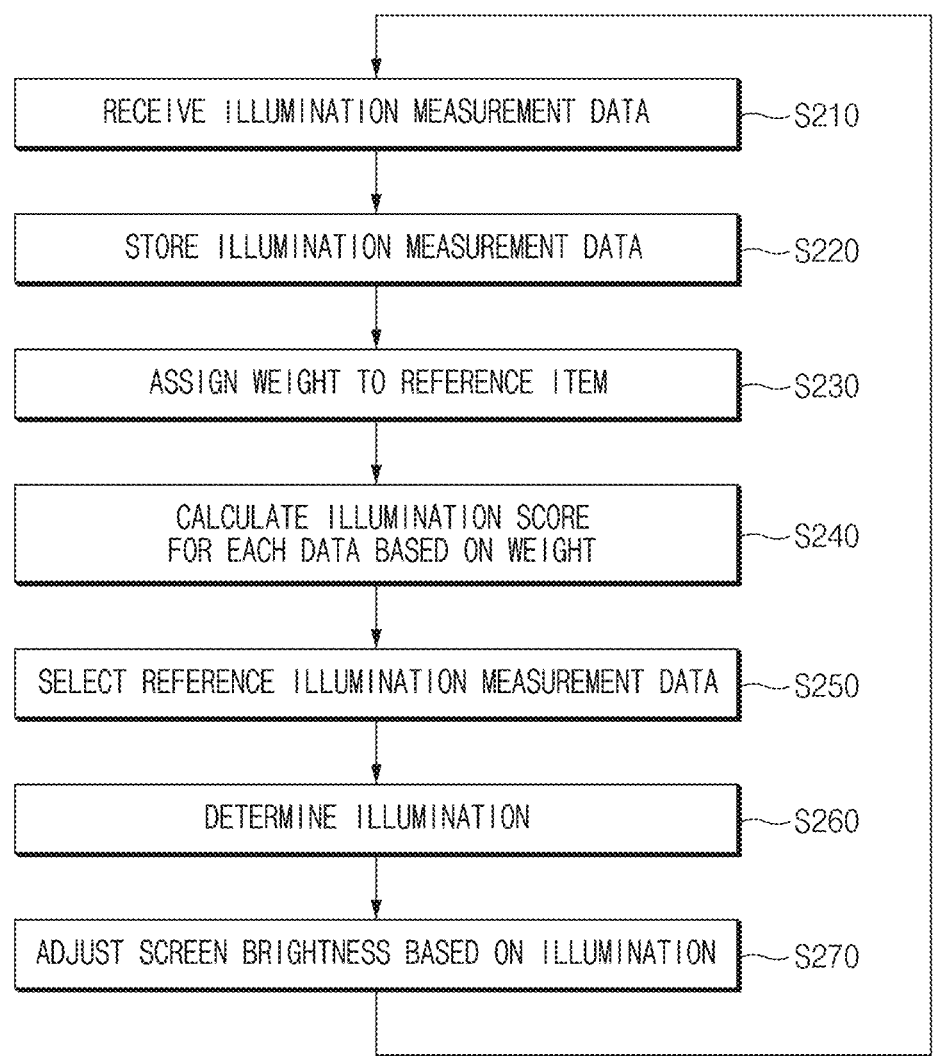
FIG. 9 is a drawing illustrating an operational flow of a screen control method of a moving object according to another embodiment of the present disclosure.

FIG. 9 is a drawing illustrating an operational flow of a screen control method of a moving object according to another embodiment of the present disclosure.

Referring to FIG. 9, when at least one illumination measurement data is received from a server 20 of FIG. 1 in S210, in S220, a screen control apparatus 100 of FIG. 1 may store the at least one received illumination measurement data.

In S230, the screen control apparatus 100 may determine reference items for calculating an illumination score among pieces of information included in the illumination measurement data stored in S220 and may assign a weight to each reference item. In this case, the weight assigned to each reference item may be determined according to a sensor measurement value. Meanwhile, the weight assigned to each reference item may be determined according to a user setting or may be determined from the result of learning a weight for a previous user setting.

In S240, the screen control apparatus 100 may calculate an illumination score for each data for the at least one illumination measurement data, based on the weight assigned to each reference time in S230.

In S240, the screen control apparatus 100 may compare information of the moving object 30 with pieces of information in data to assign a score for each reference item and may apply a weight to the score assigned for each item. Thus, an embodiment of the operation of calculating the illumination score refers to FIGS. 5 and 6.

In S250, the screen control apparatus 100 may select data with the highest illumination score as reference illumination measurement data based on the illumination score for each data calculated in S240.

Thus, in S260, the screen control apparatus 100 may determine illumination to be applied to the moving object 30 on the basis of illumination information of the reference illumination measurement data selected in S250. In S270, the screen control apparatus 100 may adjust a screen brightness of the display based on the illumination determined in S260.

Figure 10:
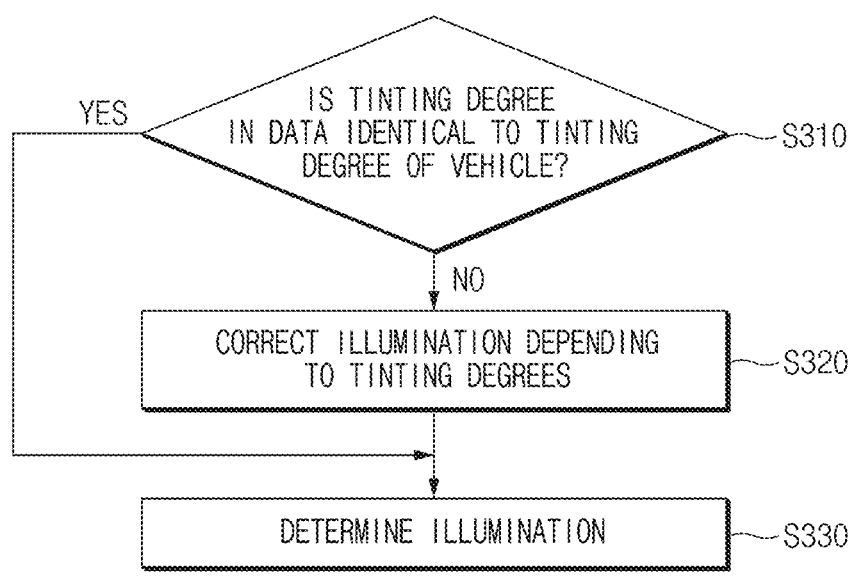
FIG. 10 is a drawing illustrating a flow of an illumination correction operation according to an embodiment of the present disclosure.

FIG. 10 illustrates an operation of correcting illumination determined in 'S150' of FIG. 8 or 'S260' of FIG. 9.

Referring to FIG. 10, when determining illumination on the basis of illumination information of reference illumination measurement data, a screen control apparatus 100 of FIG. 1 may correct the illumination depending on a tinting degree.

Herein, the screen control apparatus 100 may compare a tinting degree of a moving object 30 of FIG. 1 with a tinting degree in the reference illumination measurement data.

In this case, when the tinting degree of the moving object 30 and the tinting degree in the reference illumination measurement data are identical to each other in S310, in S330, the screen control apparatus 100 may determine illumination information of the reference illumination measurement data as illumination to be applied to the moving object 30 without performing a separate correction procedure.

Meanwhile, when the tinting degree of the moving object 30 and the tinting degree in the reference illumination measurement data are not identical to each other in S310, in S320, the screen control apparatus 100 may correct the illumination depending on the tinting degrees.

In S320, the screen control apparatus 100 may remove a tinting effect from the illumination using in the illumination and the tinting degree in the illumination measurement data and may correct the illumination by applying the tinting degree of the moving object 30 to the illumination the tinting effect is removed.

A detailed embodiment thereof refers to FIG. 7.

When the illumination is corrected in S320, in S330, the screen control apparatus 100 may determine the corrected illumination as illumination to be applied to the moving object 30.

Figure 11:
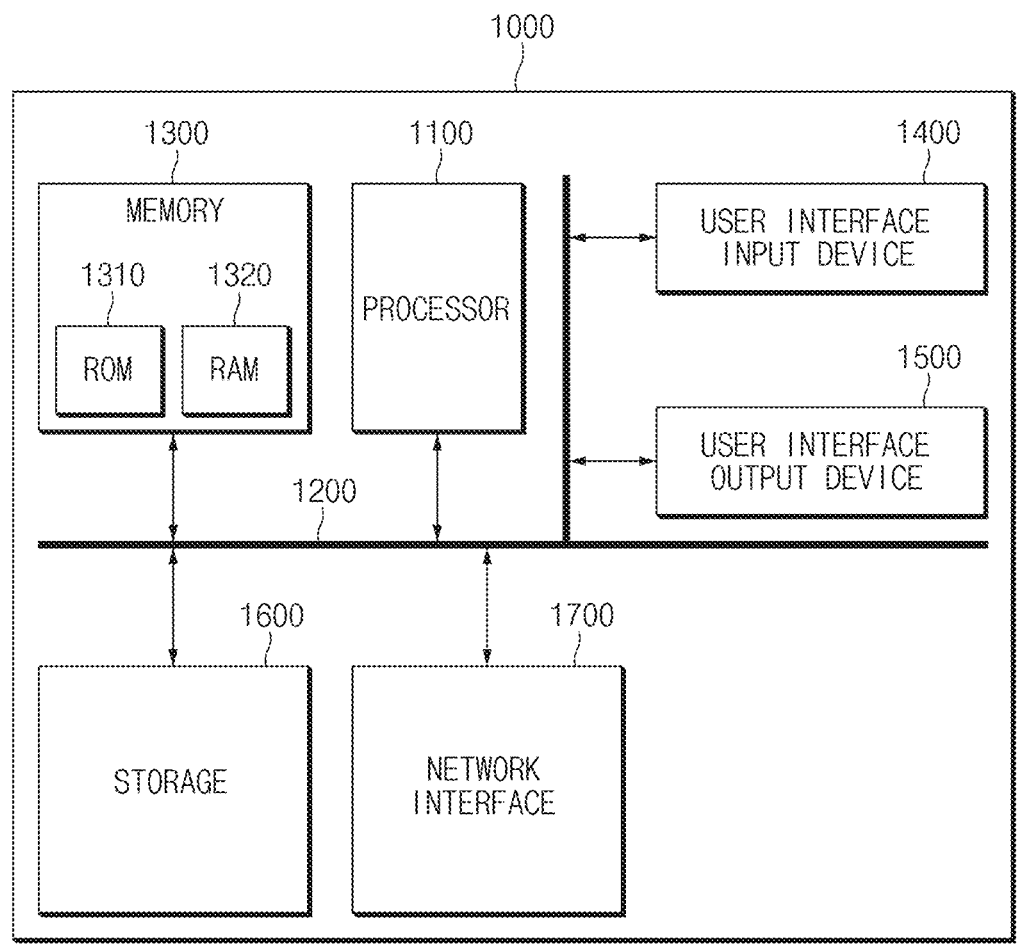
FIG. 11 is a block diagram illustrating a computing system for executing the method according to an embodiment of the present disclosure.

FIG. 11 is a block diagram illustrating a computing system for executing the method according to an embodiment of the present disclosure.

Referring to FIG. 11, a computing system 1000 may include at least one processor 1100, a non-transitory memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware, i.e., in the apparatus and/or in one or more of the devices, or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a CD-ROM. The storage medium may be coupled to the processor and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

According to embodiments of the present disclosure, the screen control apparatus may receive illumination measurement data by means of a server of a connected car system without having a separate illumination sensor. The apparatus may adjust a screen brightness of the display, thus saving the cost of constructing the sensor.

Furthermore, according to embodiments of the present disclosure, the screen control apparatus may calculate illumination scores for each of a plurality of received illumination measurement data and may assign a weight for each reference item. Thus, the most suitable screen brightness of the display may be provided.

Hereinabove, although the present disclosure has been described with reference to embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims and all the technical ideas within the scope equivalent to the claims should be included in the scope of the present disclosure.

What is claimed is:

1. A screen control apparatus of a moving object, the screen control apparatus comprising:
    a communication device configured to receive illumination measurement data measured by at least one information providing moving object from a server;
    an illumination score calculating device configured to calculate an illumination score for the received illumination measurement data;
    an illumination determining device configured to select reference illumination measurement data depending on the illumination score and determine illumination; and
    a controller configured to control a screen brightness on the basis of the determined illumination,
    wherein the illumination score calculating device compares information of the received illumination measurement data for reference items with information of the moving object to assign a score and adds the score assigned for each reference item of the reference items to calculate the illumination score of the received illumination measurement data.

2. The screen control apparatus of claim 1, wherein the illumination measurement data includes illumination information measured by the at least one information providing moving object and further includes at least one of a measurement time, a measurement position, a driving direction, sensor information, weather information, moving object information, or a tinting degree.

3. The screen control apparatus of claim 1, wherein the illumination score calculating device assigns a weight for each reference item and applies the weight for each reference item to the score assigned for each reference item to calculate the illumination score of the received illumination measurement data.

4. The screen control apparatus of claim 1, wherein the weight for each reference item is determined according to a measurement value of an environment sensor.

5. The screen control apparatus of claim 1, wherein the weight for each reference item is determined according to a user setting.

6. The screen control apparatus of claim 5, further comprising:
    a weight learning device configured to learn the weight determined according to the user setting.

7. The screen control apparatus of claim 6, wherein the weight for each reference item is determined according to the result of learning the weight.

8. The screen control apparatus of claim 1, wherein the illumination determining device selects illumination measurement data with the highest illumination score as the reference illumination measurement data.

9. The screen control apparatus of claim 1, wherein the illumination determining device corrects the illumination depending on a tinting degree of the reference illumination measurement data and a tinting degree of the moving object, when the tinting degree of the reference illumination measurement data differs from the tinting degree of the moving object.

10. The screen control apparatus of claim 9, wherein the illumination determining device upwardly adjusts an illumination of the reference illumination measurement data by the tinting degree of the reference illumination measurement data and downwardly adjusts the upwardly adjusted illumination by the tinting degree of the moving object.

11. A screen control method of a moving object, the screen control method comprising:
- receiving illumination measurement data measured by at least one information providing moving object from a server;
- calculating an illumination score for the received illumination measurement data;
- selecting reference illumination measurement data depending on the illumination score and determining illumination; and
- controlling a screen brightness on the basis of the determined illumination,
- wherein the calculating of the illumination score includes comparing information of the received illumination measurement data for reference items with information of the moving object to assign a score and adding the score assigned for each reference item of the reference items to calculate the illumination score of the received illumination measurement data.

12. The screen control method of claim 11, wherein the determining of the illumination includes:
- correcting the illumination depending on a tinting degree of the reference illumination measurement data and a tinting degree of a moving object, when the tinting degree of the reference illumination measurement data differs from the tinting degree of the moving object.

13. The screen control method of claim 12, wherein the correcting of the illumination includes:
- upwardly adjusting an illumination of the reference illumination measurement data by the tinting degree of the reference illumination measurement data and downwardly adjusting the upwardly adjusted illumination by the tinting degree of the moving object.

14. The screen control method of claim 11, wherein the calculating of the illumination score further includes:
- assigning a weight for each reference item; and
- applying the weight for each reference item to the score assigned for each reference item to calculate the illumination score of the received illumination measurement data.

15. The screen control method of claim 14, wherein the weight for each reference item is determined according to a measurement value of an environment sensor.

16. The screen control method of claim 14, wherein the weight for each reference item is determined according to a user setting.

17. The screen control method of claim 16, further comprising:
- learning the weight determined according to the user setting,
- wherein the weight for each reference item is determined according to the result of learning the weight.

18. A system, comprising:
- at least one information providing moving object configured to provide illumination measurement data based on illumination measured using an illumination sensor;
- a moving object configured to receive the illumination measurement data measured by the at least one information providing moving object, to calculate an illumination score for each illumination measurement data, and to control a screen brightness based on illumination of reference illumination measurement data selected according to the illumination score; and
- a server configured to collect and transmit the illumination measurement data between the at least one information providing moving object and the moving object,
- wherein the moving object compares information of the illumination measurement data for reference items with information of the moving object to assign a score and adds the score assigned for each reference item of the reference items to calculate the illumination score of the illumination measurement data.

* * * * *